(12) United States Patent
Law et al.

(10) Patent No.: US 7,157,950 B2
(45) Date of Patent: Jan. 2, 2007

(54) METHOD AND APPARATUS TO CONSTRUCT A FIFTY PERCENT (50%) DUTY CYCLE CLOCK SIGNAL ACROSS POWER DOMAINS

(75) Inventors: Hon-Mo Raymond Law, Beaverton, OR (US); Rachael J. Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/601,047

(22) Filed: Jun. 20, 2003

(65) Prior Publication Data

US 2004/0260963 A1   Dec. 23, 2004

(51) Int. Cl.
*H03L 7/00* (2006.01)
*H03K 19/21* (2006.01)

(52) U.S. Cl. ...................... 327/175; 327/172

(58) Field of Classification Search ........ 327/165–167, 327/291, 172–175; 331/74, 34
See application file for complete search history.

(56) References Cited

U.S. PATENT DOCUMENTS 6,737,927 B1 * 5/2004 Hsieh .......................... 331/74

OTHER PUBLICATIONS

Young, I. A., "A PLL Clock Generator with 5 to 110 MHz of Lock Range for Microprocessors," *IEEE Journal of Solid-State Circuits*, vol. 27, No. 11, (Nov. 1992), pp. 1599-1606.

Wong, K. L. et al., "Cascaded PLL Design for a 90nm High Performance Microprocessor," Intel Corporation, Hillsboro, Oregon.

* cited by examiner

*Primary Examiner*—Dinh T. Le
(74) *Attorney, Agent, or Firm*—Blakely, Sokoloff, Taylor & Zafman LLP

(57) ABSTRACT

Some microprocessors are designed such that the microprocessor core clock has a duty cycle of approximately fifty percent. When a clock signal propagates across power domains the clock signal pulse shape will change. The rising edges and falling edges of the clock signal will become asymmetrical (e.g., the duty cycle is no longer fifty percent). According to embodiments of the present invention, a parallel divide function is applied to a clock signal having a frequency f and its complement. The resulting four signals (i.e., f/2, its complement, f/2 at ninety degrees out of phase from f/2 and its complement) are applied to an XOR gate that combines them to generate a clock signal that has a duty cycle of approximately fifty percent and a frequency f, which is the same as the input clock signal.

23 Claims, 2 Drawing Sheets

METHOD AND APPARATUS TO CONSTRUCT A FIFTY PERCENT (50%) DUTY CYCLE CLOCK SIGNAL ACROSS POWER DOMAINS

BACKGROUND

1. Field

Embodiments of the present invention relate to computers and, in particular, to microprocessor clock generators.

2. Discussion of Related Art

Microprocessors use many different clocks to synchronize the operations of the various circuits inside the microprocessor. For example, one clock may determine the speed at which the microprocessor core runs (microprocessor core clock). Some microprocessors are designed such that the microprocessor core clock has a duty cycle of approximately fifty percent. A clock generator is normally used to generate the microprocessor core clock.

A limitation of clock signals is that their duty cycles are frequency dependent. The situation worsens when a clock signal propagates across power domains. For example, when the clock signal has to cross power domains, the clock signal pulse shape will change. The rising edges and falling edges of the clock signal will become asymmetrical (e.g., the duty cycle is no longer fifty percent).

One common way of ameliorating this situation is to have the power supply to the clock generator be the same as the power supply to the microprocessor core. For example, the power supply to the microprocessor and the clock generator can be maintained at 1.3 volts.

This solution may be feasible to maintain duty cycle performance on a very small scale, but has its drawbacks. For example, this solution is not very versatile. In general, the more products the clock generator/microprocessor combination is compatible with the better. Sometimes a server application may run better when the clock generator operates at 1.3 volts $V_{CC}$ (or $V_{DD}$) and the microprocessor operates at 1.7 volts $V_{CC}$. A desktop application may run better when the clock generator operates at 1.5 volts $V_{CC}$ and the microprocessor operates at 1.7 volts $V_{CC}$. A mobile application may run better when the clock generator operates at 1.3 volts $V_{CC}$ and the microprocessor operates at 1.0 volt $V_{CC}$. Thus, although adequate, this approach has its limitations.

Another traditional way of making this situation better is to allow the clock to cross power domains but then in the destination domain to apply a divide-by-two function to the rising edges of the clock generator output to obtain the microprocessor core clock signal. Because the divide-by-two approach uses only the rising edges of clock generator output to determine both rising and falling edges of the microprocessor core clock signal the clock generator output duty cycle is irrelevant to the microprocessor core clock signal duty cycle. As long as the clock generator output period is stable, the microprocessor core clock signal duty cycle will be fifty percent. Because of this same reason, the clock generator output can be distributed across power domains while maintaining microprocessor core clock signal symmetry.

A drawback to this approach is that as technology advances its implementation becomes quite expensive. In general, the less expensive individual components are for a computer, the less expensive the computer. For a clock generator to work with state of the art microprocessors that operate at three gigahertz (GHz), for example, the clock generator must output a six GHz clock signal. As the frequency of the clock generator increases, its complexity increases. As the complexity of the clock generator circuit increases, it becomes a less attractive technique to construct a microprocessor core clock signal that has a duty cycle of approximately fifty percent across power domains. This is because the area that the clock generator consumes increases. The clock generator also consumes more power.

DETAILED DESCRIPTION OF THE ILLUSTRATED EMBODIMENTS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
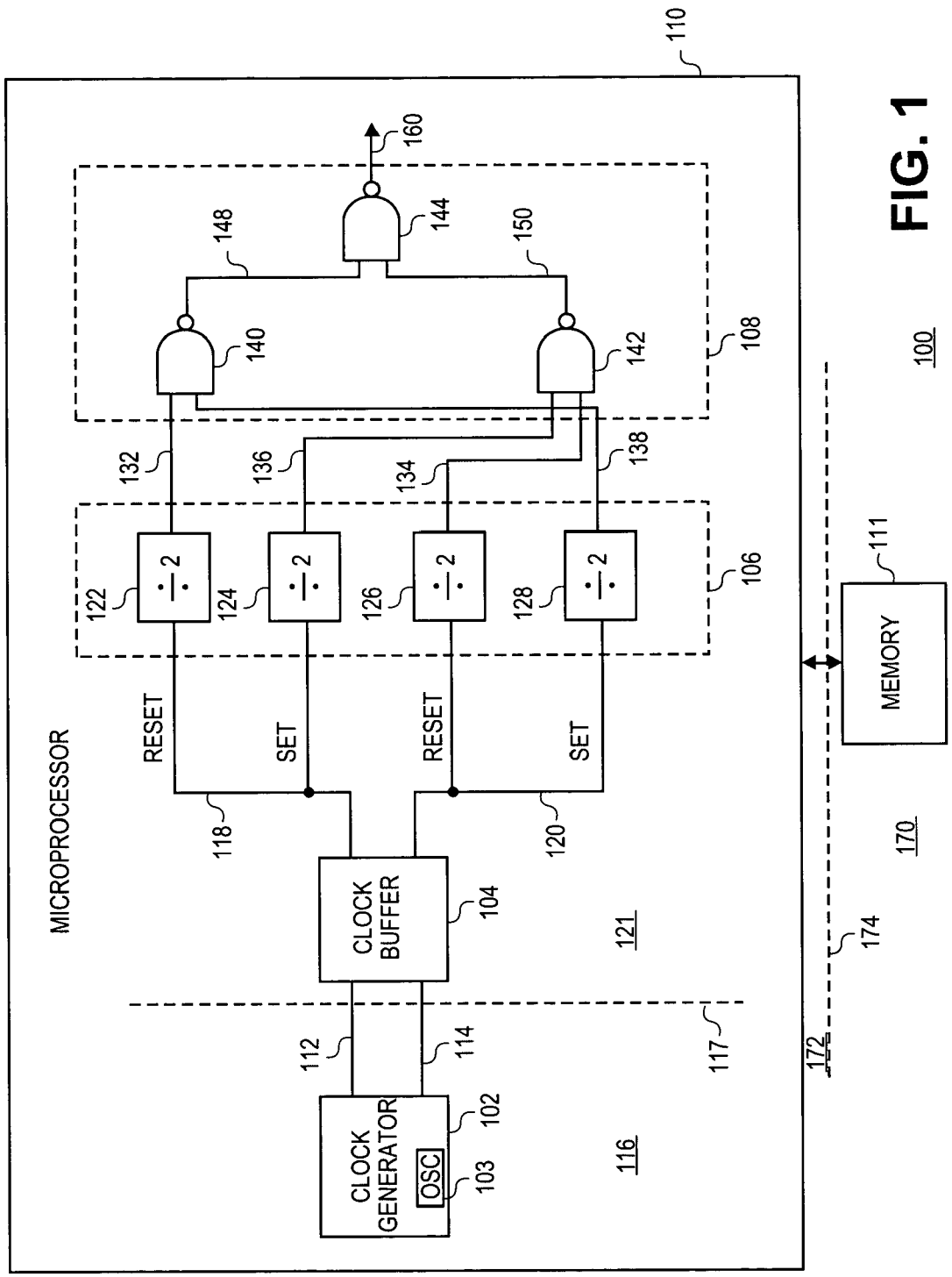
FIG. 1 is a schematic diagram of a computer system according to an embodiment of the present invention.

FIG. 1 is a high-level block diagram of a computer system 100 according to an embodiment of the present invention. The system 100 includes a clock generator 102 coupled to a clock buffer 104. The clock buffer 104 is coupled to parallel divide-by-two circuitry 106. The parallel divider circuitry 106 is coupled to an exclusive OR (XOR) gate 108. In the embodiment of the present invention illustrated in FIG. 1, the clock generator 102, clock buffer 104, parallel divide-by-two circuitry 106, and XOR gate 108 are part of a microprocessor 110. In alternative embodiments of the present invention, the clock generator 102, clock buffer 104, parallel divide-by-two circuitry 106, and/or the XOR gate 108 may be external to the microprocessor 110. The microprocessor 110 is coupled to a memory 111.

The example clock generator 102 provides two output clocks 112 and 114. An oscillator 103 inside the clock generator 102 outputs 112 and 114 have a frequency f. The oscillator outputs 112 and 114 are complementary such that when the oscillator output 112 is high the oscillator output 114 is low and when the oscillator output 112 is low the oscillator output 114 is high. The oscillator outputs 112 and 114 have approximately a fifty percent duty cycle, however, even though they are one hundred eighty degrees out of phase with each other.

In known microprocessor core clock generating circuits, both the clock signal and its complement are not used. Only one is used because one is adequate to accommodate relatively low operating frequencies. In embodiments of the present invention, both oscillator outputs 112 and 114 are coupled to and used by the clock buffer 104. As will be described below, a parallel divide function is applied to generate four signals (i.e., f/2, its complement, f/2 at ninety degrees out of phase from f/2 and its complement). The four signals are then applied to an XOR gate that recombines them to generate a clock signal that has a duty cycle of approximately fifty percent and the frequency f, which is not half (f/2) the frequency f of the oscillator outputs 112 and 114 but the same frequency f as the oscillator outputs 112 and 114.

Embodiments of the present invention thus provide a clock generator 102/microprocessor 110 combination that may be compatible with more applications such a servers, desktops, and mobile computers. Other embodiments of the invention may be less expensive to implement because the frequency f of the microprocessor core clock is the same frequency f as the oscillator outputs 112 and 114.

The example clock buffer 104 receives the oscillator outputs 112 and 114 and buffers them to provide two clock signals 118 and 120, respectively. The dashed line 117 indicates that the clock generator 102 is in the power domain 116 and the clock buffer 104 is in the power domain 121. As a result, the duty cycles of the clock signals 118 and 120 are no longer fifty percent.

Figure 2:
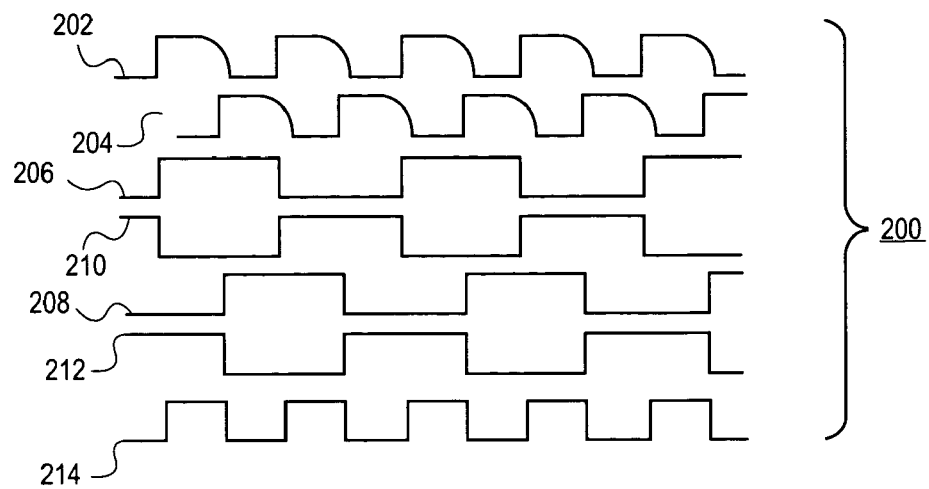
FIG. 2 is a graphical representation of timing among circuits in the computer system in FIG. 1 according to an embodiment of the present invention.

FIG. 2 is a graphical representation 200 of the timing in the system 100 according to an embodiment of the present invention. A timing diagram 202 represents the clock signal 118 and a timing diagram 204 represents the clock signal 120. Note that the clock signals 118 and 120 are complementary such that when the clock signal 118 is high the clock signal 120 is low and when the clock signal 118 is low the clock signal 120 is high. The clock signals 118 and 120 have the frequency f. Also note that the falling edges of clock signals 118 and 120 are slower than the rising edges of the clock signals. This is caused by the voltage of the power domain 121 being less than the voltage of power domain 116. Thus, while the oscillator outputs 112 and 114 have a fifty percent duty cycle, the clock signals 118 and 120 have duty cycle well above fifty percent.

The clock signals 118 and 120 are input to the parallel divider circuitry 106. The parallel divider circuitry 106 includes four divide-by-two circuits 122, 124, 126, and 128.

The example divide-by-two circuit 122, which is preset to logic "zero," (e.g., as indicated by "RESET") receives the clock signal 118 and outputs a signal 132 that is one-half the frequency of the clock signal 118 (or f/2). A timing diagram 206 represents the signal 132. Note that the divide-by-two circuit 122 switches on the rising edge of the clock signal 118.

The example divide-by-two circuit 126, which is also preset to logic "zero," (e.g., as indicated by "RESET") receives the clock signal 120 and outputs a signal 134 that is one-half the frequency of the clock signal 120 (or f/2). A timing diagram 208 represents the signal 134. Note that the divide-by-two circuit 126 switches on the rising edge of the clock signal 120 and the signal 134 is ninety degrees out of phase with the signal 132.

The example divide-by-two circuit 124, which is preset to logic "one," (e.g., as indicated by "SET") receives the clock signal 118 and outputs a signal 136 that is one-half the frequency of the clock signal 118 (or f/2). A timing diagram 210 represents the signal 136. Note that the divide-by-two circuit 124 switches on the rising edge of the clock signal 118 and the signal 136 is the complement to the signal 132.

The example divide-by-two circuit 128, which also is preset to logic "one," (e.g., as indicated by "SET") receives the clock signal 120 and outputs a signal 138 that is one-half the frequency of the clock signal 120 (or f/2). A timing diagram 212 represents the signal 138. Note that the divide-by-two circuit 128 switches on the rising edge of the clock signal 120 and the signal 138 is the complement to the signal 134.

Of course, embodiments of the present invention may be implemented other than as described above. For example, embodiments may be implemented by having the divide-by-two circuit 122 preset to logic "one," the divide-by-two circuit 124 preset to logic "zero," the divide-by-two circuit 126 preset to logic "one," and the divide-by-two circuit 128 preset to logic "zero." After reading the description herein, a person of ordinary skill in the relevant art will readily recognize how to implement such embodiments of the present invention.

The XOR gate 108 includes three NAND gates 140, 142, and 144. The NAND gate 140 receives the signals 132 and 138. When the signals 132 and 138 change to become the same state the NAND gate 140 changes states from logic "one" to logic "zero" or vice versa. The output of the NAND gate 142 is a signal 148.

The NAND gate 142 receives the signals 134 and 136. When the signals 134 and 136 change to become the same state the NAND gate 142 changes states from logic "one" to logic "zero" or vice versa. The output of the NAND gate 142 is a signal 150.

The NAND gate 144 receives the signals 148 and 150. When the signals 148 and 150 change to become the same state the NAND gate 144 changes states from logic "one" to logic "zero" or vice versa. The output of the NAND gate 144 is the clock signal 160. Because the signals 132/136 and 134/138 are two sets of complementary signals that are ninety degrees out of phase with each other, the XOR gate 108 may be used to recombine the signals 132/136 and 134/138 to arrive at the clock signal 160.

The timing diagram 214 shows the clock signal 160. Note that the clock signal 160 has a duty cycle of approximately fifty percent and has a frequency f that is the same as the frequency f of the oscillator output 112. In one embodiment, the duty cycle of the resulting clock signal ranges from approximately 0.475 (47.5%) and 0.525 (52.5%). In an alternative embodiment of the present invention, the duty cycle of the resulting clock signal ranges from approximately 0.493 (49.3%) to 0.514 (51.4%). Other embodiments may have narrower duty cycles.

The clock generator 102 may be any circuit that generates a signal suitable for use as a clock signal. For example, the clock generator 102 may be a phase-locked loop clock generator having a voltage-controlled oscillator (VCO). Suitable clock generators are known.

The clock buffer 104 may be any circuit that is capable of buffering the output of the clock generator 102. Suitable buffers are known.

Microprocessors suitable for implementing the microprocessor 110 are known. A suitable microprocessor includes an Intel® Pentium® 4 microprocessor available from Intel® Corporation in Santa Clara, Calif.

The memory 111 may be any known dynamic random access memory (DRAM), static RAM (SRAM), Flash memory, etc.

In the embodiment shown in FIG. 2, the microprocessor 110, and the clock buffer 104 are shown in the power domain 121 and the clock generator 102 is shown in the power domain 116. In an alternative embodiment, the memory 111 is in the power domain 170 and the microprocessor 110 is in the power domain 172, as indicated by the dashed line 174. The power domains 116, 121, 170, and 172 may be analog power domains and/or digital power domains. In either case, the clock signal 160 constructed from the oscillator outputs 112 and 114 has a duty cycle of approximately fifty percent and a frequency f that is the same frequency f as the oscillator outputs 112 and 114.

The timing from one input to one output of either of the NAND gates 140, 142, and/or 144 may not be the same. This is because their inputs, whose rise times and fall times may be different, come from four different paths. As a result, the signals 148 and 150 may not be symmetrical. When the signals 148 and 150 are not symmetrical the signal 160 may not be stable.

Figure 3:
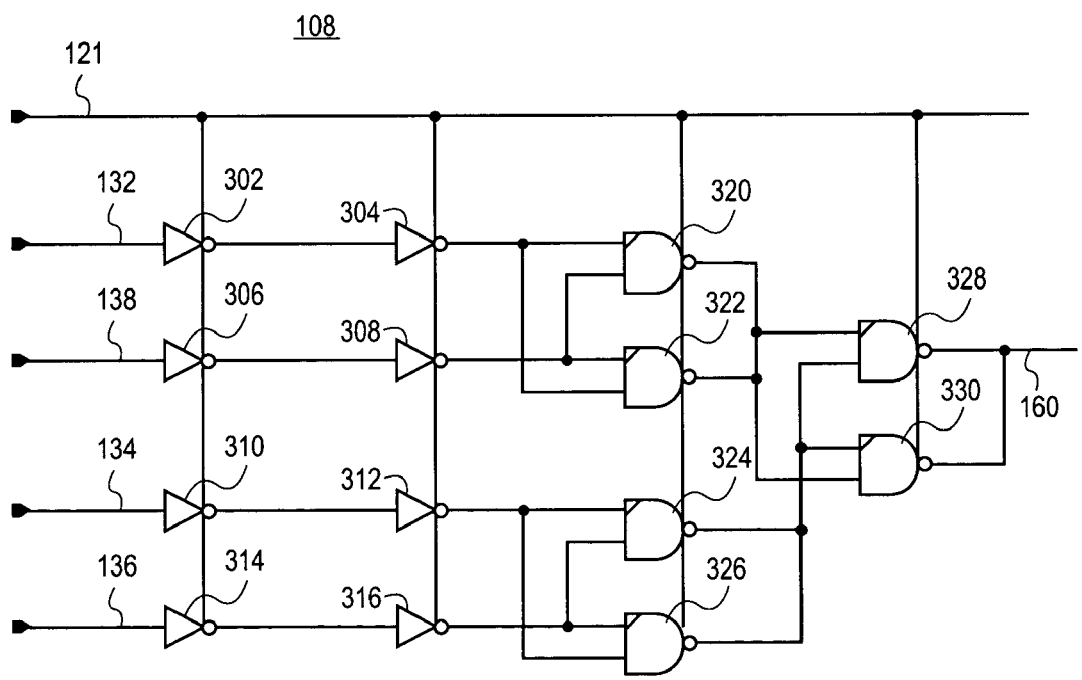
FIG. 3 is a schematic diagram of an exclusive OR gate according to an embodiment of the present invention.

FIG. 3 is a schematic diagram showing the XOR gate 108 in more detail according to an embodiment of the present invention in which the XOR gate 108 is balanced to provide symmetrical outputs for the NAND gates 140 and 142. The symmetrical signals 148 and 150 provide a more stable signal 160.

The XOR gate 108 includes eight inverters 302, 304, 306, 308, 310, 312, 314, and 316, and six NAND gates 320, 322, 324, 326, 328, and 330. $V_{CC}$ from the power domain 121 is coupled to each inverter 302, 304, 306, 308, 310, 312, 314, and 316, and each NAND gates 320, 322, 324, 326, 328, and 330.

The inverter 302 is coupled to drive the signal 132 to the inverter 304, which drives one input of the NAND gate 320 and one input of the NAND gate 322. The inverter 306 is coupled to drive the signal 138 to the inverter 308, which drives the other input of the NAND gate 322 and the other input of the NAND gate 320.

The outputs of the NAND gates 320 and 322, which are now symmetrical, are applied to one input of the NAND gate 328 and one input of the NAND gate 330. The outputs of the NAND gates 324 and 326, which also are now symmetrical, are applied to the other input of the NAND gate 328 and the other input of the NAND gate 330. The outputs of the NAND gates 328 and 330, which are now symmetrical, are combined to generate the signal 160.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

Of course, embodiments of the present invention are not limited to clocks for microprocessors. For example, embodiments of the present invention may be used in other systems (e.g., input/output (I/O) systems) to maintain a duty cycle of approximately fifty percent cycle across power domains.

The above description of illustrated embodiments of the invention is not intended to be exhaustive or to limit embodiments of the invention to the precise forms disclosed. While specific embodiments of, and examples for, the invention are described herein for illustrative purposes, various equivalent modifications are possible, as those skilled in the relevant art will recognize. These modifications can be made in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Various operations have been described as multiple discrete operations performed in turn in a manner that is most helpful in understanding embodiments of the invention. However, the order in which they are described should not be construed to imply that these operations are necessarily order dependent or that the operations be performed in the order in which the operations are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. An apparatus, comprising:
    circuitry coupled to receive a clock signal having a frequency f and to output a first signal in phase with the clock signal at one-half the frequency f and a second signal one hundred eighty degrees out of phase with the first signal, the circuitry coupled to receive a complementary clock signal having a duty cycle of approximately fifty percent and the frequency f and to output a third signal ninety degrees out of phase with the first signal and a fourth signal one hundred eighty degrees out of phase with the third signal; and
    an exclusive OR circuit coupled to receive the first, second, third, and fourth signals and to output a second clock signal having a duty cycle of approximately fifty percent and the frequency f.

2. The apparatus of claim 1, further comprising a buffer circuit coupled between the clock generator and each of the first, second, third, and fourth divide-by-two circuits.

3. The apparatus of claim 1, wherein the circuitry comprises:
    a first divide-by-two circuit coupled to receive the first signal and preset to logic "0";
    a second divide-by-two circuit coupled to receive the second signal and preset to;
    a third divide-by-two circuit coupled to receive the third signal and preset to logic "0"; and
    a fourth divide-by-two circuit coupled to receive the fourth signal and preset to logic "1".

4. The apparatus of claim 3, wherein the exclusive OR circuit comprises:
    a first NAND gate coupled to receive the first signal and the fourth signal and to change output state from logic "1" to logic "0" when the first and fourth signals are logic "1", and to change output state from logic "0" to logic "1" when the first and fourth signals are logic "0";
    a second NAND gate coupled to receive the second signal and the third signal and to change output state from logic "1" to logic "0" when the second and third signals are logic "1", and to change output state from logic "0" to logic "1" when the second and third signals are logic "0"; and
    a third NAND gate coupled to receive the first NAND gate output states and the second NAND gate output states and to output the second clock.

5. The apparatus of claim 4, wherein the exclusive OR circuit further comprises:
- a first set of inverters coupled to receive the first signal and apply the first signal to a first input of a fourth NAND gate and a first input of a fifth NAND gate; and
- a second set of inverters coupled to receive the fourth signal and apply the fourth signal to a second input of a fourth NAND gate and a second input of a fifth NAND gate, the fourth and fifth NAND gates to change output state from 1 to 0 when the first and fourth signals have the same logic value of 1.

6. The apparatus of claim 5, wherein the exclusive OR circuit further comprises:
- a third set of inverters coupled to receive the third signal and apply the third signal to a first input of a sixth NAND gate and a first input of a seventh NAND gate; and
- a fourth set of inverters coupled to receive the second signal and apply the second signal to a second input of a sixth NAND gate and a second input of a seventh NAND gate, the sixth and seventh NAND gates to change output state from 1 to 0 when the second and third signals have the same logic value of 1.

7. The apparatus of claim 6, wherein the exclusive OR circuit further comprises:
- an eighth NAND gate coupled to receive the fourth, fifth, sixth, and seventh NAND output states and to change output state from 1 to 0 when the fourth, fifth, sixth, and seventh NAND output states have the same logic value of 1; and
- a ninth NAND gate coupled to receive the fourth, fifth, sixth, and seventh NAND output states and to change output state from 1 to 0 when the fourth, fifth, sixth, and seventh NAND output states have the same logic value of 1.

8. A method, comprising:
- receiving a clock signal having a frequency f;
- outputting a first signal in phase with the clock signal at one-half the frequency f and a second signal one hundred eighty degrees out of phase with the first signal;
- receiving a complementary clock signal for the clock signal; outputting a third signal ninety degrees out of phase with the first signal and a fourth signal one hundred eighty degrees out of phase with the third signal;
- receiving the first, second, third, and fourth signals; and
- outputting a second clock signal having a duty cycle of approximately fifty percent and the frequency f.

9. The method of claim 8, further comprising buffering the clock signal and buffering the complementary clock signal.

10. The method of claim 8, wherein the outputting the first signal and the second signal further comprises dividing the frequency f of the clock signal by two; and
- wherein the outputting the third signal and the fourth signal further comprises dividing the frequency f of the complementary clock signal by two.

11. The method of claim 10, wherein the outputting the first signal and the second clock signal further comprises exclusive OR-ing the first, second, third, and fourth signals with each other.

12. A system, comprising:
- circuitry coupled to receive a clock signal having a frequency f and to output a first signal in phase with the clock signal at one-half the frequency f and a second signal one hundred eighty degrees out of phase with the first signal, the circuitry coupled to receive a complementary clock signal having a duty cycle of approximately fifty percent and the frequency f and to output a third signal ninety degrees out of phase with the first signal and a fourth signal one hundred eighty degrees out of phase with the third signal;
- an exclusive OR circuit coupled to receive the first, second, third, and fourth signals and to output a second clock signal having a duty cycle of approximately fifty percent and the frequency f; and
- a static random access memory (SRAM) coupled to the circuitry.

13. The system of claim 12, further comprising a clock generator coupled to generate the clock signal and the complementary clock signal and to provide the clock signal and the complementary clock signal to the circuitry.

14. The system of claim 13, wherein the clock generator comprises a phase-locked loop clock generator.

15. The system of claim 14, wherein the phase-locked loop clock generator comprises a voltage-controlled oscillator.

16. A method, comprising:
- receiving a first clock signal and its complementary clock signal from a first power domain, the clock signal and the complementary clock signal each having a duty cycle of approximately fifty percent and a frequency f;
- outputting a first signal in phase with the clock signal at one-half the frequency f and a second signal one hundred eighty degrees out of phase with the first signal by dividing the frequency f of the clock signal by two in a second power domain; and
- outputting a third signal ninety degrees out of phase with the first signal and a fourth signal one hundred eighty degrees out of phase with the third signal by dividing the frequency f of the complementary clock signal by two in the second power domain; and
- receiving the first, second, third, and fourth signals and outputting a second clock signal having a duty cycle of approximately fifty percent and the frequency by exclusive OR-ing the divided-by-two clock signal and the divided-by-two complementary clock signal in the second power domain to generate a second clock signal having a duty cycle of approximately fifty percent and the frequency f.

17. The method of claim 16, further comprising:
- buffering the clock signal in the second power domain; and
- buffering the complementary clock signal in the second power domain.

18. An article of manufacture, comprising:
- a machine-accessible medium including instructions that, when accessed by a machine, cause the machine to perform operations comprising the method of:
  - receiving a clock signal having a frequency f' and outputting a first signal in phase with the clock signal at one-half the frequency f and a second signal one hundred eighty degrees out of phase with the first signal;
  - receiving a complementary clock signal for the clock signal and outputting a third signal ninety degrees out of phase with the first signal and a fourth signal one hundred eighty degrees out of phase with the third signal; and
  - receiving the first, second, third, and fourth signals and outputting a second clock signal having a duty cycle of approximately fifty percent and the frequency f.

19. The article of manufacture of claim 18, wherein the instructions are further to cause the machine to perform operations comprising buffering the clock signal and buffering the complementary clock signal.

20. The article of manufacture of claim 18, wherein the instructions are further to cause the machine to perform operations comprising:

outputting a first signal in phase with the clock signal at one-half the frequency f and a second signal one hundred eighty degrees out of phase with the first signal by dividing the frequency f of the clock signal by two; and outputting a third signal ninety degrees out of phase with the first signal and a fourth signal one hundred eighty degrees out of phase with the third signal by dividing the frequency f of the complementary clock signal by two.

21. The article of manufacture of claim 20, wherein the instructions are further to cause the machine to perform operations comprising outputting a second clock signal having a duty cycle of approximately fifty percent and the frequency by exclusive OR-ing the first, second, third, and fourth signals with each other.

22. An article of manufacture, comprising:

a machine-accessible medium including instructions that, when accessed by a machine, cause the machine to perform operations comprising the method of:

receiving a first clock signal and its complementary clock signal from a first power domain, the clock signal and the complementary clock signal each having a duty cycle of approximately fifty percent and a frequency f;

outputting a first signal in phase with the clock signal at one-half the frequency f and a second signal one hundred eighty degrees out of phase with the first signal by dividing the frequency f of the clock signal by two in a second power domain;

outputting a third signal ninety degrees out of phase with the first signal and a fourth signal one hundred eighty degrees out of phase with the third signal by dividing the frequency f of the complementary clock signal by two in the second power domain;

exclusive OR-ing the divided-by-two clock signal and the divided-by-two complementary clock signal in the second power domain to generate a second clock signal having a duty cycle of approximately fifty percent and the frequency f.

23. The article of manufacture of claim 22, wherein instructions are further to cause the machine to perform operations comprising:

buffering the clock signal in the second power domain; and buffering the complementary clock signal in the second power domain.

* * * * *